Dec. 1, 1936.  S. A. LEROUGE  2,062,721
LIQUID HEATING DEVICE
Filed Feb. 11, 1936
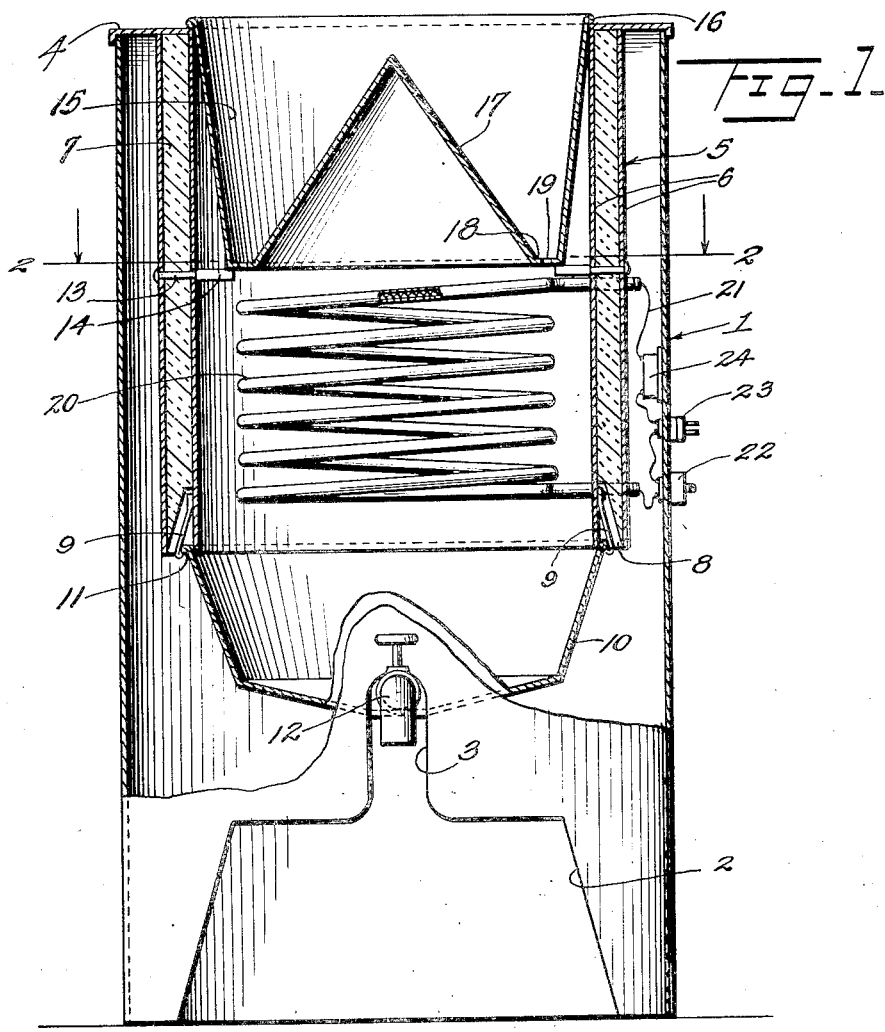
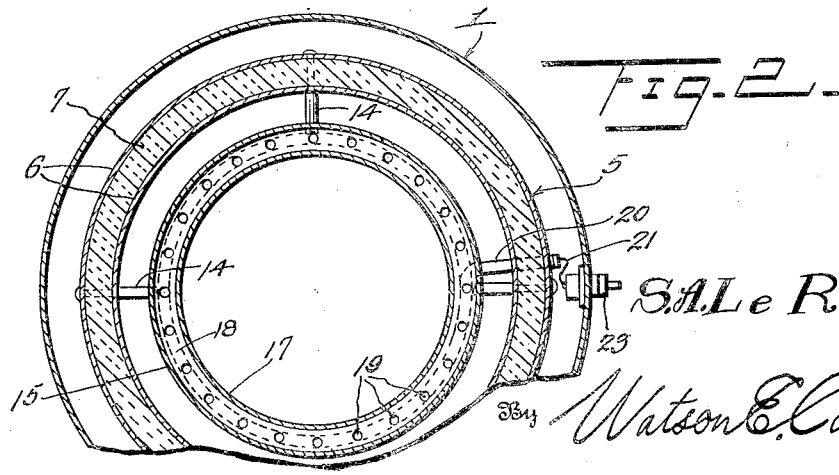
Inventor
S. A. Le Rouge
By Watson E. Coleman
Attorney Patented Dec. 1, 1936

2,062,721

UNITED STATES PATENT OFFICE 2,062,721

LIQUID HEATING DEVICE

Stephen A. Lerouge, Battle Ground, Wash.

Application February 11, 1936, Serial No. 63,425

5 Claims. (Cl. 219—38)

This invention relates to the class of heating devices and pertains particularly to a device for heating liquids.

The primary object of the present invention is to provide a liquid heating device by means of which very small quantities or large quantities of liquid may be instantly heated.

Another object of the invention is to provide a liquid heating device wherein novel means is employed for heating the liquid quickly by dropping or flowing the liquid in small quantities over a heating element.

A still further object of the invention is to provide a liquid heater wherein the parts may be easily and quickly separated for cleaning as required, and wherein the construction is such that the device may be made small for use upon the table, or of a large size for heating large quantities of water or other liquids.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view partly in elevation and partly in vertical section, of the heater embodying the present invention.

Figure 2 is a sectional view taken on the line 2—2 of Fig. 1.

Referring now more particularly to the drawing wherein like numerals of reference designate corresponding parts throughout the several views, the numeral 1 indicates a housing or shell for the present heating device. The shell here shown is of circular cross-section, although it may be rectangular or of any other cross-sectional configuration, and there is cut into the lower part the recess 2 which merges into a vertically extending slot or passage 3 for the purpose hereinafter described.

Suspended from the top edge of the casing 1 is an annular plate 4 to which is joined an insulating cylinder 5 which is made up of the inner and outer cylindrical shells 6 and insulation material between the shells, as indicated at 7, which material may be of asbestos, porcelain, or any other suitable insulating substance. The cylinder 5 is suspended, as previously stated, from the annular plate 4 and terminates at its lower end a substantial distance above the slot 3, and the insulation material 7 is cut away at several places, as indicated by the numeral 8, to allow for the attachment to the outer side of the inner cylindrical member 6 of resilient clips or fasteners 9.

The numeral 10 indicates a liquid receiving basin which has a top diameter sufficient to receive the lower edge of the inner cylinder 6 and when the basin is disposed as illustrated the beaded edge 11 thereof will be resiliently held by the inturned lower ends of the resilient fasteners 9 so that fluid passing downwardly through the insulated cylinder will all pass into the basin. This basin 10 is provided with a suitable faucet 12, by means of which the contents of the basin may be drawn off, and this faucet is located in the recess 3 so that as will be readily apparent, when the basin is pulled downwardly so as to disengage the beaded edge of the same from the spring handles 9, the basin may be withdrawn through the opening 2 in the bottom of the casing 1.

The inner and outer cylindrical portions of the insulated cylinder 5 are joined by the reduced parts 13 of bolts 14 which project into the insulated cylinder in the manner shown. These bolts serve the double purpose of holding the inner and outer portions of the insulation cylinder together and of providing supporting means for an upper or top liquid receiver or basin 15. This top receiver is of greater diameter at its top edge than at its bottom and is provided with an outwardly turned flange 16 which engages over the top of the annular plate 4 when the receiver is inserted through the plate and into the insulation cylinder 5. When the beaded portion 11 is in engagement with the plate 4 the bottom of the basin 15 will rest upon the bolts 14.

The top basin 15 is provided with a cone-like central part or bottom 17 so that the actual bottom of the basin which lies between the base of the cone and the wall of the basin and which is indicated by the numeral 18, is relatively narrow and is of annular formation. This bottom 18 is provided with a plurality of liquid outlet apertures 19 through which liquid introduced into the basin 15 may drip and pass downwardly into the receiving basin 10.

Disposed in the insulation cylinder 5 between the upper and lower basins is a circular or helical heater coil, the diameter of which is the same as the diameter of the circle upon which the apertures 19 of the upper basin are disposed, so that the liquid passing through the apertures from the upper basin will drip directly upon the coils and flow downwardly over the same into the lower basin, and as these coils are electrically heated by a resistance wire 21 which passes therethrough, it will be apparent that the liquid will be instantly heated as it comes into contact with the heated coils.

It is preferred that the wall of the shell 1 may have mounted thereon a control switch 22 and a plug unit 23 whereby current may be passed from a suitable household current conductor into the resistance element 21 of the heating coil 20. The numeral 24 indicates a resistance unit to cut down the flow of current through the heating coil when the plug 23 is connected with the usual 120-volt house-lighting circuit.

From the foregoing it will be readily apparent that a device embodying the present invention is of simple design and therefore may be economically produced and also that it will be effective in producing instantly heated liquids and may be made upon a large or small scale to suit the conditions under which it is intended to be used. Also the construction is such that the device may be readily taken apart for cleaning or for replacement of parts when necessary.

I claim:

1. A liquid heater comprising a pair of spaced superposed open-top receptacles, a casing for the receptacles connecting and maintaining the same in said spaced relation, said upper receptacle having an annular series of liquid outlet openings in its bottom, and a helical heating coil disposed between the receptacles and concentric with the series of apertures, said coil being of the same diameter as the circle described by the series of apertures, and valve means for drawing off liquid from the lower receptacle.

2. A liquid heater comprising a vertically disposed cylindrical body, a receptacle removably disposed in the upper end of said body, a receptacle having an open top detachably connected with the lower end of the body, said first receptacle having a bottom provided with an annular series of liquid outlet apertures, and a helical heating coil disposed between the receptacles and in spaced relation with the same and arranged to have liquid passing through said apertures fall upon the convolutions thereof.

3. A liquid heater comprising a casing, a cylindrical body of insulation disposed vertically within the casing, a receptacle suspended in the upper end of the cylindrical body, said receptacle having a bottom provided with an annular series of outlet apertures, a lower receptacle having an open top of a diameter to receive the lower part of the cylindrical body, means detachably coupling the top of the lower receptacle with the cylindrical body, and a helical heating coil disposed between the receptacles and having the convolutions thereof arranged directly beneath the openings in the bottom of the first receptacle.

4. A liquid heater comprising a casing, a cylindrical body of insulation disposed vertically within the casing, a receptacle suspended in the upper end of the cylindrical body, said receptacle having a bottom provided with an annular series of outlet apertures, a lower receptacle having an open top of a diameter to receive the lower part of the cylindrical body, means detachably coupling the top of the lower receptacle with the cylindrical body, a helical heating coil disposed between the receptacles and having the convolutions thereof arranged directly beneath the openings in the bottom of the first receptacle, said casing having an opening through the lower part of its wall to facilitate the insertion of the lower receptacle, and a faucet connected with the casing to facilitate the drawing off of the contents thereof.

5. In a liquid heater, a vertically disposed casing, a cylindrical body removably supported in the casing, said cylindrical body being of heat insulating material, a receptacle removably suspended in the upper end of said cylinder and having an annular series of apertures in its bottom, a helical heating coil disposed in the cylinder beneath the receptacle and having a diameter substantially equal to the diameter of said annular series of apertures whereby liquid passing through the apertures will impinge upon said coil, a second receptacle, means detachably coupling the second receptacle with the lower end of said cylinder, means facilitating the removal of the liquid from the second receptacle, and means whereby the second receptacle may be conveniently removed through the wall of the casing.

STEPHEN A. LEROUGE.